United States Patent [19]

Dreckmann et al.

[11] Patent Number: 4,695,346

[45] Date of Patent: Sep. 22, 1987

[54] APPARATUS FOR APPLYING TRANSVERSE WELD SEAMS TO AN INTERMITTENTLY MOVED PLASTIC FOIL WEB

[75] Inventors: Karl Dreckmann, Hennef-Altenbödingen; Jakob Schneider, Niederkassel-Mondorf; Hans-Werner Theuner, Troisdorf-Müllekoven, all of Fed. Rep. of Germany

[73] Assignee: Lemo M. Lehmacher & Sohn GmbH Maschinenfabrik, Niederkassel-Mondorf, Fed. Rep. of Germany

[21] Appl. No.: 796,644

[22] Filed: Nov. 8, 1985

[30] Foreign Application Priority Data

Nov. 10, 1984 [DE] Fed. Rep. of Germany ....... 3441173
Jun. 14, 1985 [DE] Fed. Rep. of Germany ....... 3521351

[51] Int. Cl.[4] .............................................. B32B 31/20
[52] U.S. Cl. .................................... 156/361; 156/251; 156/515; 156/538
[58] Field of Search .............. 156/515, 251, 361, 538; 226/137, 138, 139, 140, 141, 142

[56] References Cited

U.S. PATENT DOCUMENTS

| | | | |
|---|---|---|---|
| 3,650,449 | 3/1972 | Mundus | 226/142 |
| 4,011,978 | 3/1977 | Lehmacher | 226/142 |
| 4,217,163 | 8/1980 | Utzmann | 156/361 |
| 4,371,413 | 2/1983 | Mundus | 156/349 |

FOREIGN PATENT DOCUMENTS 3026038 4/1982 Fed. Rep. of Germany.

Primary Examiner—Donald E. Czaja
Assistant Examiner—J. Davis
Attorney, Agent, or Firm—Karl F. Ross; Herbert Dubno

[57] ABSTRACT

An apparatus for applying transverse welds on a plastic foil web in dependence on the print register is provided with a conveyor which is advanced by means of a control unit intermittently and synchronously with respect to a welding unit. The control unit includes a drive disk whose eccentric pin is adjustable and guided by an eccentric block. Via a coupling rod, the drive disk is connected to a rocker which is accommodated in a gear segment and whose oscillation is adjustable by a spindle. The gear segment cooperates with the conveyor via a clutch-brake unit which provides the intermittent advance of the conveyor by uncoupling from or connecting the latter with the gear segment and is controlled by a plurality of contactless switch elements. For precise adjustment of the advance of the conveyor, the spindle cooperates with a motor which operates in dependence on the print register as monitored by a photocell. To allow a rough adjustment in the event of print registers of different kind, the eccentric pin on the drive disk is adjustable.

2 Claims, 8 Drawing Figures

APPARATUS FOR APPLYING TRANSVERSE WELD SEAMS TO AN INTERMITTENTLY MOVED PLASTIC FOIL WEB

FIELD OF THE INVENTION

Our present invention relates to an apparatus for applying transverse weld seams to an intermittently moved single-layer or multilayer (plural-layer) plastic foil web which has been printed with a respective print register.

BACKGROUND OF THE INVENTION

From U.S. Pat. No. 4,371,413 (see also German patent publication DE-OS No. 30 26 038), an apparatus is known for applying transverse weld seams to a thermoplastic foil which includes a conveyor which is synchronized and intermittently advanced with respect to a welding unit.

Controlling the movement of the conveyor and of the welding unit is a control unit which includes a drive disk supported on a crankshaft and provided with an eccentric crank pin which is displaceable in a slot of a rocker to oscillate the latter.

Mounted on the rocker is an adjusting spindle which supports a movable slide block. Connected to the slide block is one end of a coupling rod, whose other end supports a gear segment which is operatively aligned with the conveyor.

By adjusting the slide block along the spindle, the stroke of the oscillations of the rocker about its respective journal or axis are controlled and transmitted to the gear segment which accordingly advances the conveyor via a suitable transmission In order to provide an intermittent advance of the conveyor, a clutch-brake unit connected between the conveyor and the transmission uncouples the gear segment from the conveyor and brakes the latter until being at a standstill or connects the respective parts to provide the advance of the conveyor.

In this prior art apparatus, the rocker oscillates about a stationary axis and is connected to the drive disk which is designed as a gear and provided with a non-adjustable eccentric pin. Since the coupling rod is not directly connected to the eccentric pin but rather to the slide block of the rocker, the eccentric pin is only used to convert the rotation of the disk into the oscillating motion of the rocker while the actual kinematics are determined by the adjustable slide block. Consequently, the conveyor is brought to a standstill over a predetermined period during each cycle for thermal welding while the duration of the standstill period is controlled by the adjustable spindle.

The disadvantage of this system is that a precise or fine adjustment of the conveyor is not possible, i.e. there is no provision to correct the position of the weld seam in dependence on the print register. Frequently the print register is altered because of inherent tolerances or due to stretching with respect to the plastic foil web so that the respective weld seams are not accurately associated with each print image. Moreover, this apparatus does not provide for a coarse setting enabling adjustment to different kinds or sizes of print registers.

OBJECTS OF THE INVENTION

It is thus the principal object of our invention to provide an improved apparatus for applying transverse weld seams to a plastic foil web obviating the aforestated drawbacks.

Another object is to provide an apparatus which permits versatile coarse and fine adjustment of a transverse weld seam to a print register.

SUMMARY OF THE INVENTION

We realize this object, according to the invention, by providing a gear segment which accommodates a swing connected to a spindle and linked to a drive disk via a coupling rod. By means of a setting or motor servomotor, the spindle is adjustable in dependence on the print register on the web so that the advance of the conveyor transporting the web is controllable.

Arranged upstream of the welding unit which provides the transverse weld seams on the web along the transport path of the web is a photocell which monitors the print register and transmits a corresponding signal to the motor to allow precise or fine adjustment of the spindle and thus control of the advance of the conveyor via the oscillating gear segment and an intermediate clutch-brake unit.

For allowing a rough adjustment or setting of the advance of the conveyor or web feed for a print register of a different kind, the drive disk is provided with an eccentric pin which is adjustable radially with respect to the axis of rotation of its eccentric e.g. by selective insertion in one of a number of radially spaced holes.

According to the teachings of the invention, the rocker is used to allow a fine adjustment according to the tolerances of the print register. This is possible because of the arrangement of the rocker and the provision of a photocell which transmits a signal to the motor in dependence on the print register. The motor is advantageously connected to the spindle via a toothed belt in the preferred and best-mode embodiment of the invention.

However, also other suitable transmission elements can be used with somewhat less effectiveness, like for example a universal-joint shaft. Simultaneously, the apparatus according to the invention provides the possibility of a rough adjustment when using plastic foil webs of different print registers by adjusting the position of the eccentric pin radially on the drive disk as described.

According to another feature of the invention, the clutch-brake unit is controlled by contactless switch elements which are arranged on the one hand on the coupling rod before and behind the eccentric pin and on the other hand at a carrier which is connected to an eccentric block guiding the eccentric pin in radial direction of the drive disk. Preferably, the switch elements are provided along the center axis of the coupling rod and of its extension in elongation of the axis.

In addition to the advantage of providing a fine adjustment as well as a rough adjustment, the apparatus according to the invention has a further advantage in that the clutch and the brake of the respective unit are subjected to low stress, independent on the respective switch adjustment.

Thus the invention provides that regardless of the position of the journal of the rocker during fine adjustment via the spindle and regardless of the positional relationship between eccentric pin and journal, the periodically moved masses are always at rest when the eccentric pin, the journal and the coupling rod lie in a single straight line which, depending on the various positions, is differently inclined with respect to the horizontal.

BRIEF DESCRIPTION OF THE DRAWING

The above and other objects, features and advantages of our present invention will become more readily apparent from the following description, reference being made to the accompanying drawing in which.

SPECIFIC DESCRIPTION

Figure 1:
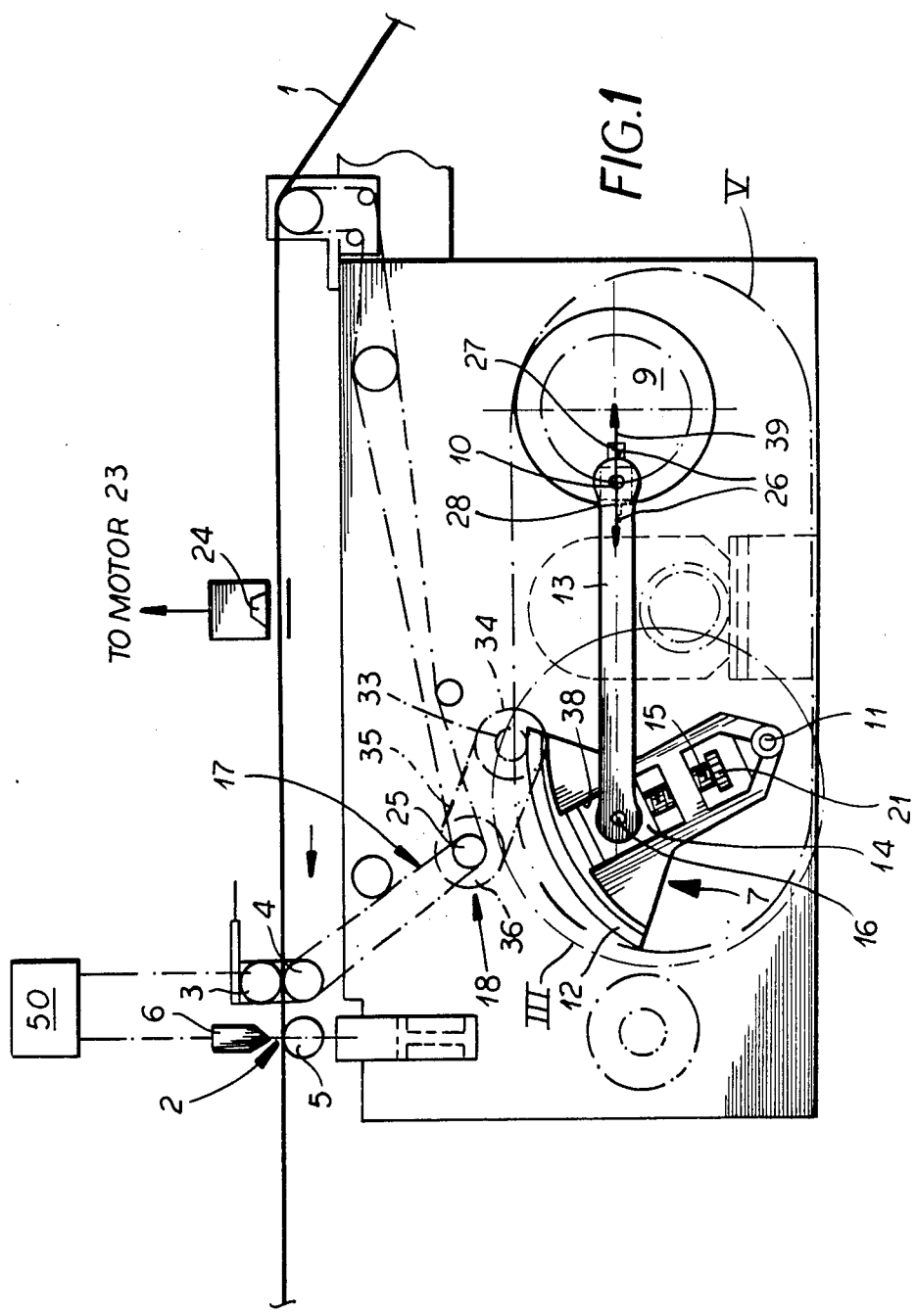
FIG. 1 is a side view of a preferred embodiment of an apparatus according to the invention.

In the drawing, there is shown an apparatus for applying transverse welds to an intermittently moved (stepped) single-layer or multilayer plastic foil web 1 which has been periodically printed with a printing register, i.e. with a pattern with substantially fixed spacing between successive imprints.

The apparatus according to the invention is schematically illustrated in FIG. 1 and includes a welding unit 2 having a stationary weld jaw 5 and a movable weld jaw 6 which is reciprocated by a suitable drive 50 for example via a crank mechanism with crank pin, connecting rod and tappet rod.

The drive is connected to a further drive 8 which actuates a conveyor or web feeder consisting of a pair of superimposed feed rollers 3, 4 for advancing the web 1 and is moved stepwise and synchronous to the welding unit 2. The conveyor 3, 4 cooperates with a control unit which is generally characterized by reference numeral 7. The control unit 7 is connected to the feeder 3, 4 which is connected to the drive for the movable weld jaw 6 for synchronization of the welder operation with the web advance under the common control of unit 7.

Figure 2:
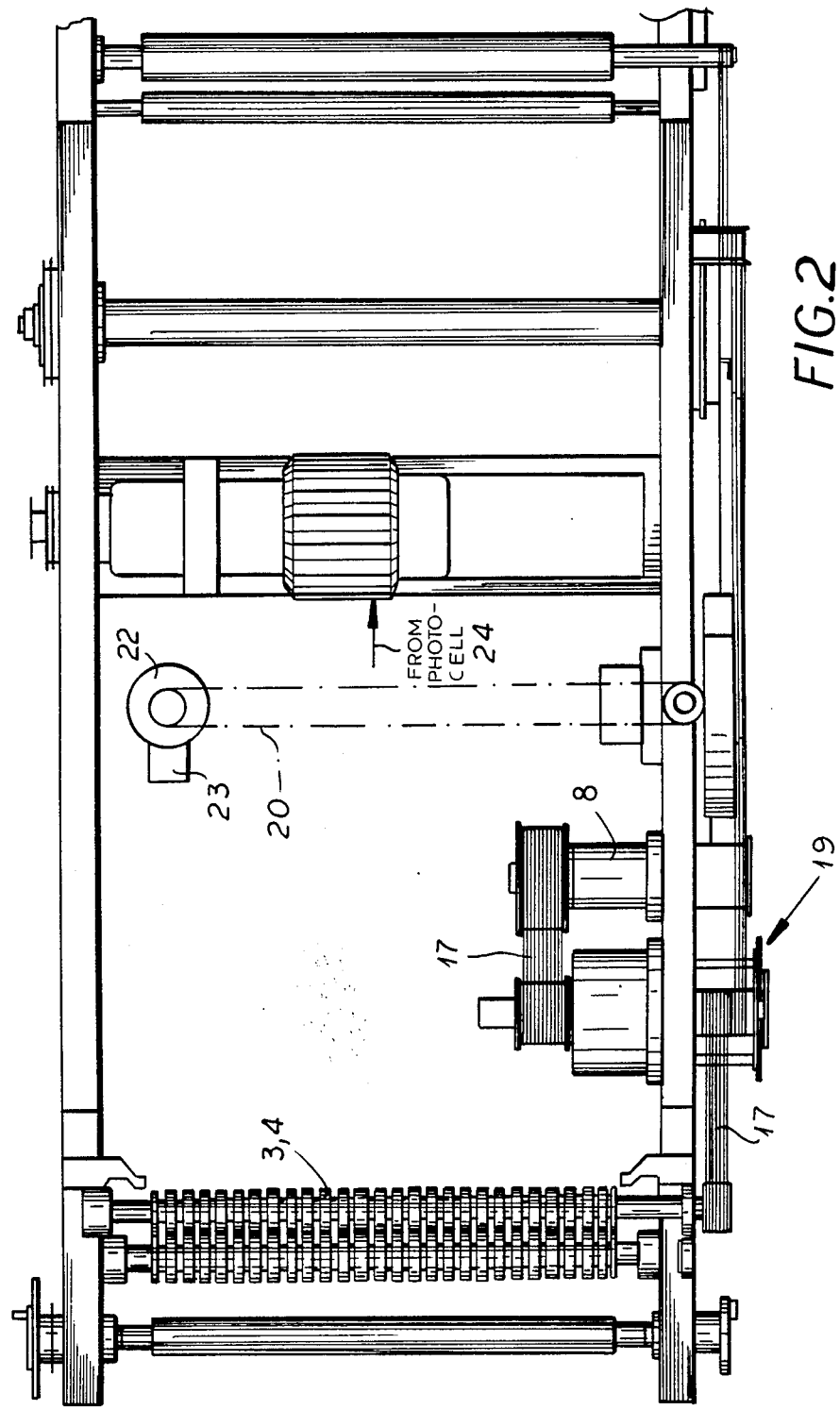
FIG. 2 is a top view of the apparatus of FIG. 1.
Figure 3:
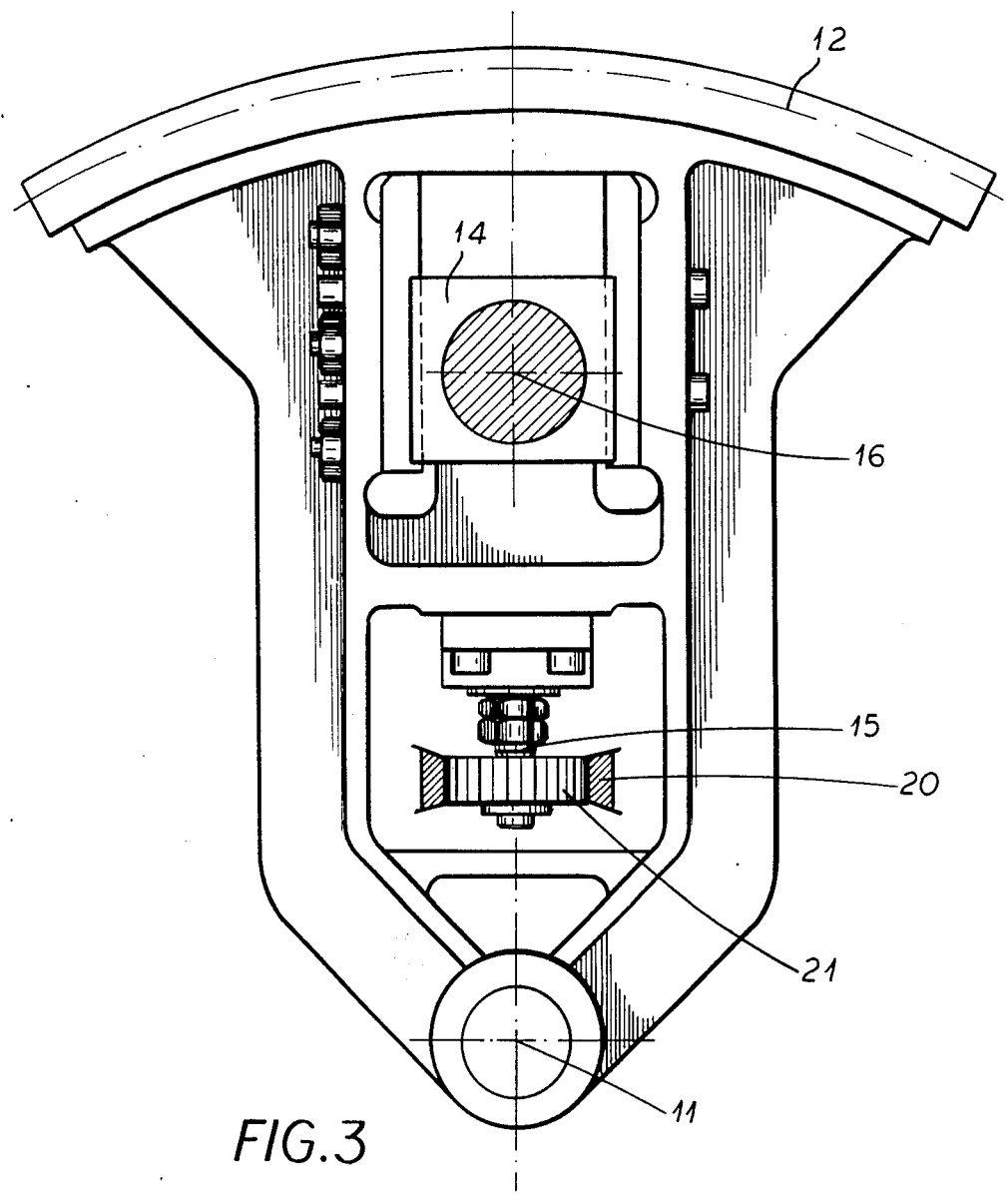
FIG. 3 is a detailed illustration of an enlarged scale of a gear segment at region III in FIG. 1.
Figure 4:
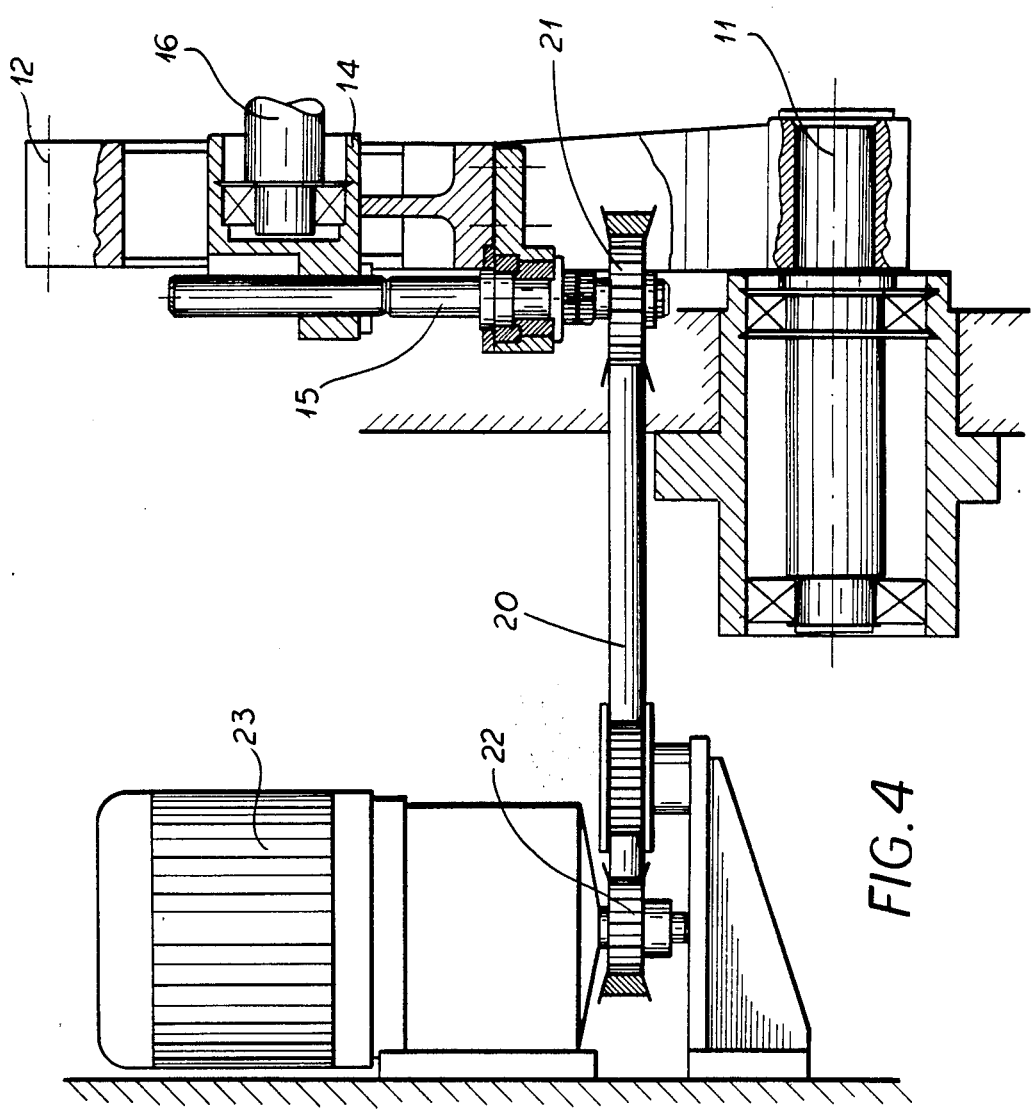
FIG. 4 is a partially sectional side view of the gear segment of FIG. 3.

The control unit 7 includes a drive disk 9 provided with an eccentric pin 10 and cooperating with a gear segment 12 which is movable to and fro during operation about a pivot 11. Meshing with the teeth of the gear segment 12 is a gear 33 which drives a pulley 34. Running about the pulley 34 a further pulley 36 which carries a sprocket wheel 25 is a belt 35. The sprocket wheel 25 is connected to the feed roller 4 via a toothed belt 17 so that the movement of the gear segment 12 is transmitted to the conveyor 3, 4. Controlling the run of the toothed belt 17 is a clutch-brake unit 19 which is generally known, e.g. from U.S. Pat. No. 4,371,413 or DE-OS No. 3 26 038 an connected between the gear segment 12 and the sprocket wheel 25 (FIG. 2). As will be described hereinbelow, the clutch-brake unit 19 operates in such a manner that a movement of the gear segment 12 to the right in FIG. 1 causes an advance of the web 1 by the conveyor 3, 4 while a movement to the left thereof stops the transport of the web 1 thus allowing to provide the respective welding seams.

Centrally accommodated within the gear segment 12 in a respective recess 38 is a rocker 14 which is supported by a journal 16 and moves together with the segment 12 about the pivot 11. The journal 16 carries one end of a coupling rod 13 whose other end is fixed to the eccentric pin 10. For displacing the journal 16 in a longitudinal direction of the rocker 14, the latter is connected to an adjusting spindle 15 which is actuated by a stationary control motor 23. The connection between the motor 23 and the spindle 15 is provided via a toothed belt 20 which runs about a gear 21 fixed to the lower end of the spindle 15 and a drive gear 22 of the motor 23.

The motor 23 operates in response to a photocell 24 which senses the print register of the advancing web 1 and transmits the information to the motor 23. In dependence on the information of the photccell 24, the motor 23 corrects in a precise manner the position of the spindle 15 so that the web 1 is advanced by the conveyor 3, 4 in a precise manner via the oscillating gear segment 12 thus allowing the application of the weld seams at a correct position.

In order to allow also a rough adjustment in case the web 1 is provided with a different print register, the eccentric pin 10 of the coupling rod 13 is adjustable as indicated by double arrow 39 in FIG. 1. This coarse adjustment can take the form of a number of radially spaced holes in disk 9 which can selectively receive the pin 10.

The clutch-brake unit 19 is controlled by a plurality of contactless switch elements 26, 27, 28 for coupling the conveyor 3, 4 i.e. actually the feed roller 4, with or uncoupling the conveyor 3, 4 from the gear segment 12.

The switch elements 26, 27, 28 are provided on the coupling rod 13 in front of the eccentric pin 10 as well as behind the latter on an extension 32 and are arranged on a carrier 30 which is connected to an eccentric block 29.

The eccentric block 29 guides the eccentric pin 10 and extends with the carrier 30 in radial direction of the drive disk 9.

Preferably, the switch elements 26, 27, 28 extend on the center axis 31 of the coupling rod 13 and of the extension 32 of the rod 13. The switch elements 26, 27, 28 are thus arranged in a manner that the switching is provided always at the reverse points of the periodical motion and are preferably designed on the coupling rod 13 as contactless switches. In this case, it is possible to provide the switch element 28 as switch tag on the carrier 30 at the eccentric block 29.

Figure 5:
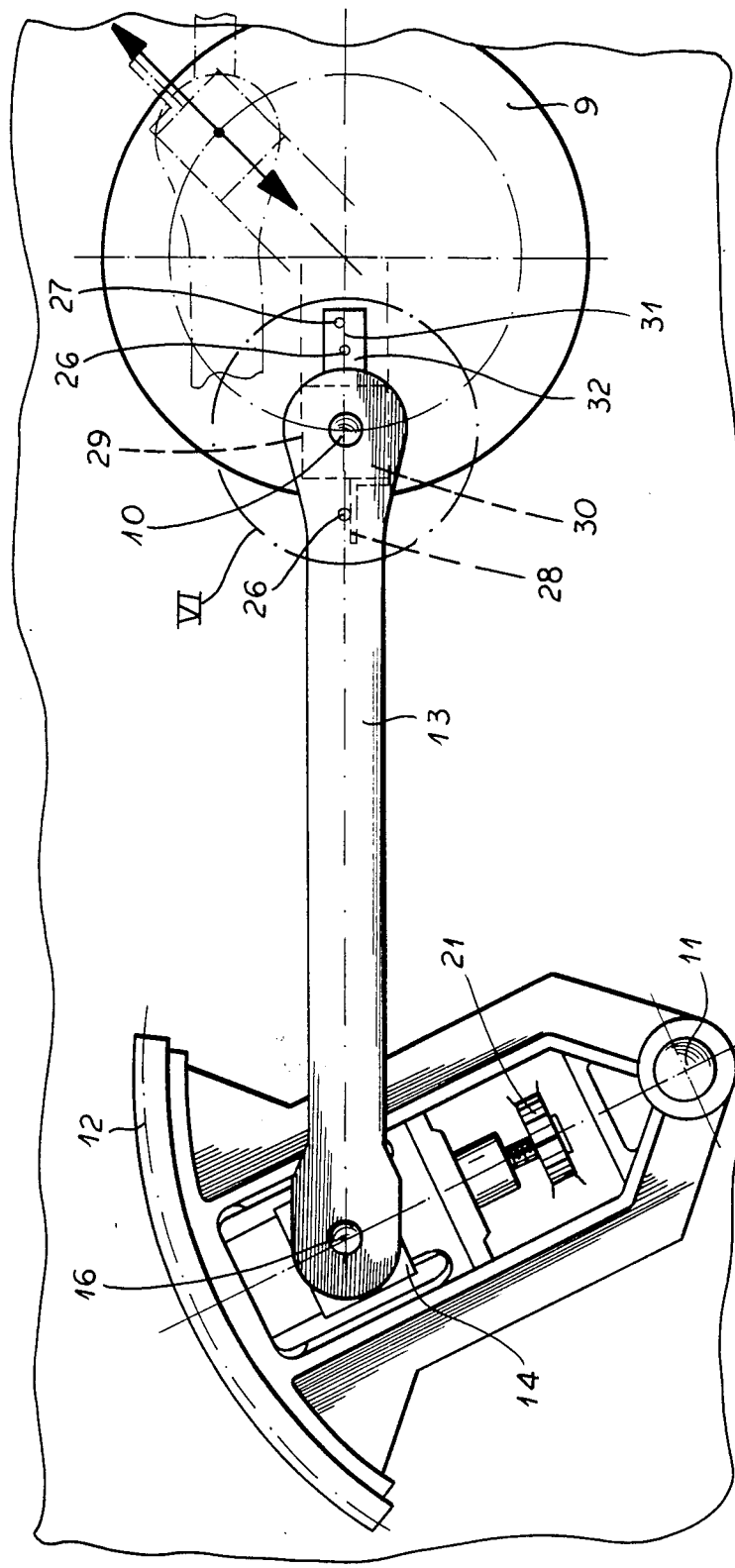
FIG. 5 is a detailed illustration on an enlarged scale of the region V in FIG. 1 showing the gear segment connected to a drive disk via a coupling rod.
Figure 6:
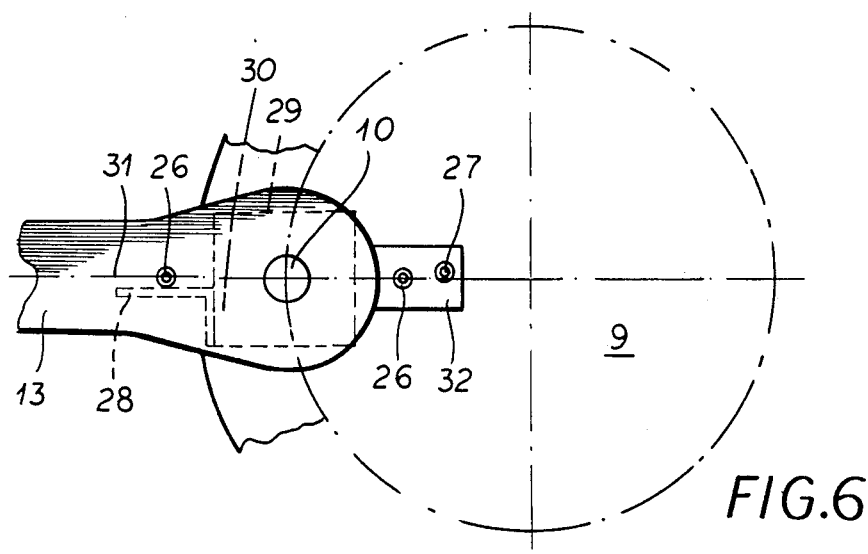
FIG. 6 is a detailed illustration of region VI in FIG. 5 showing one position of the coupling rod on the drive disk.

Turning now to FIGS. 5–8 which illustrate different positions of the coupling rod 13 and the control of the clutch-brake unit 19. In the position as shown in FIG. 5, the plastic foil web 1 is still at a standstill as the gear segment 12 has been moved from right to left. When the periodically appearing print image on the plastic foil web 1 has reached a predetermined and controlled position as indicated in FIGS. 5 and 6, the clutch of the unit 19 is just activated by the switch element 26 so that the gear segment 12 is linked to the conveyor 3, 4 to provide the advance of the web 1. The coupling rod 13 moves in radial direction about the drive disk 9 whereby the eccentric block 29 is rotated as shown in FIG. 5 in dash dot lines by an intermediate position of the eccentric block 29.

Figure 7:
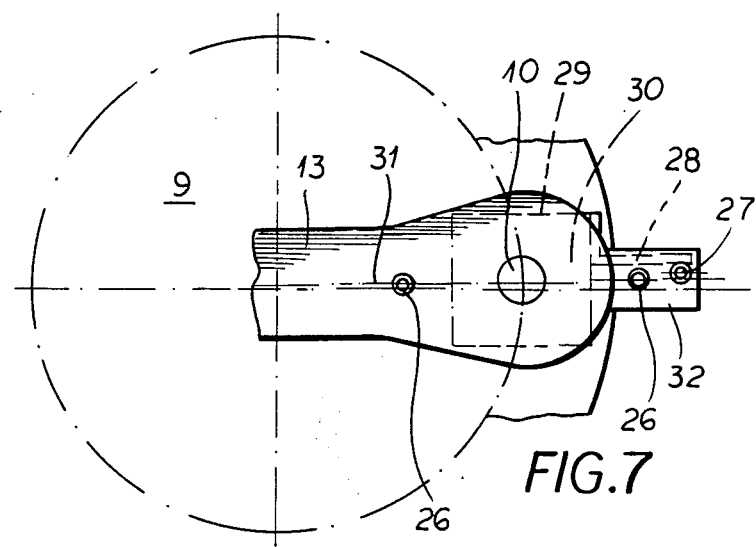
FIG. 7 is a view corresponding to FIG. 6 showing a further position of the coupling rod on the drive disk.
Figure 8:
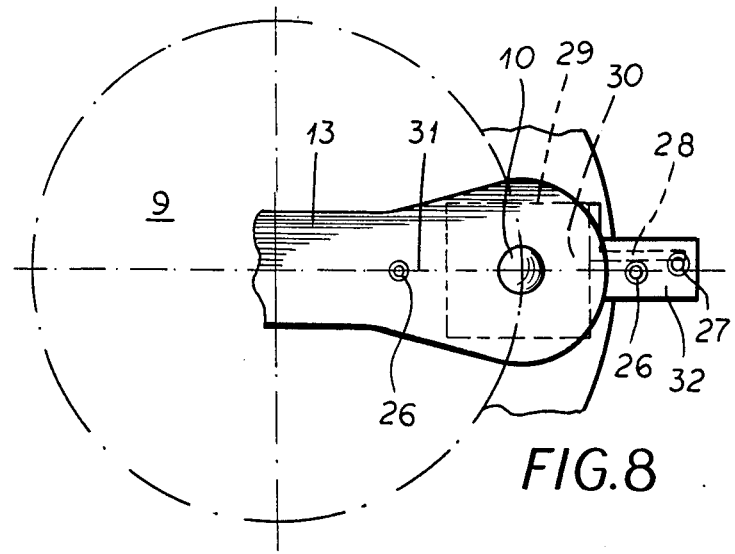
FIG. 8 is another view corresponding to FIG. 6 illustrating still another position of the coupling rod on the drive disk.

When the coupling rod 13 is in the position as shown in FIG. 7, the end of the periodically appearing print image has reached the predetermined position and the switch element or tag 28 cooperates with the switch element 27 which causes the brake of the unit 19 to be activated. Almost simultaneously with the braking, the clutch of the unit 19 is disengaged which coincides with the position of the coupling rod 13 as illustrated in FIG. 8 and indicating the switch element 26 as the controlling element and cooperating with the switch tag 28. The gear segment 12 is then returned into the position as shown in FIG. 5 during which period, the web 1 is at a standstill so as to allow the application of the weld seam.

We claim:

1. An apparatus for applying a transverse weld seam to a web in dependence upon a print register on said web, said apparatus comprising:

means defining a transport path for said web extending in a longitudinal direction thereof;

a welding unit extending across said path and actuatable to apply a transverse weld thereto;

conveying means engageable with said web for advancing said web along said path and including a pinion gear;

means operatively coupling said conveying means and said welding unit for synchronous operation thereof;

a drive disk rotatable about a first axis;

a coupling rod pivotally connected as a first pivot at one end with said drive disk eccentrically of said axis;

means for selectively positioning said first pivot on said disk at a selected distance from said first axis for coarse setting of the advance of said web in accordance with the print register thereon;

a rocker pivotally connected at a second pivot to an opposite end of said coupling rod;

a gear segment swingable about a second axis parallel to said first axis and spaced therefrom and meshing with said pinion gear, said rocker being shiftable along said gear segment generally radially of said second axis.

a threaded spindle coupled with said rocker for shifting same generally radially of said second axis upon rotation of said threaded spindle;

a toothed wheel on said threaded spindle;

a toothed belt engaging said toothed wheel;

a setting motor having another toothed wheel engaging said belt for displacing said spindle for fine adjustment of the advance of said web in accordance with said print register thereon; and photocell upstream of said welding unit along said path for detecting the print register on said web and controlling said setting motor for fine adjustment of a location of a weld seam for each print register successively passing said photocell and said welding unit.

2. The apparatus defined in claim 1 wherein said rocker is disposed at a center of said gear segment, said conveying means includes a belt drive coupled with said pinion gear by a clutch-brake unit, said clutch-brake unit being controlled by a plurality of switch elements mounted on said rod.

* * * * *